May 17, 1955
L. J. SCHMID
2,708,562
VALVE PLUG RETAINING DEVICE
Filed Feb. 5, 1951
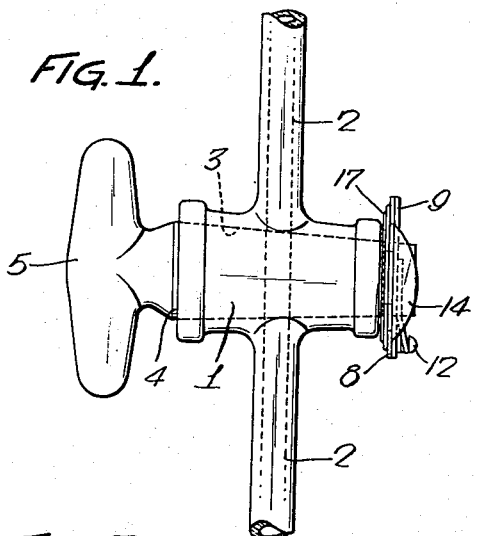
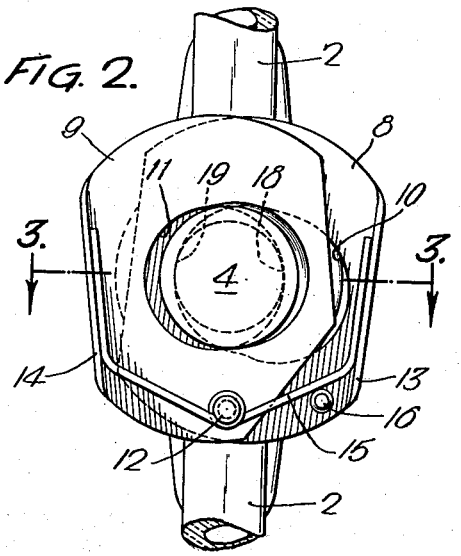
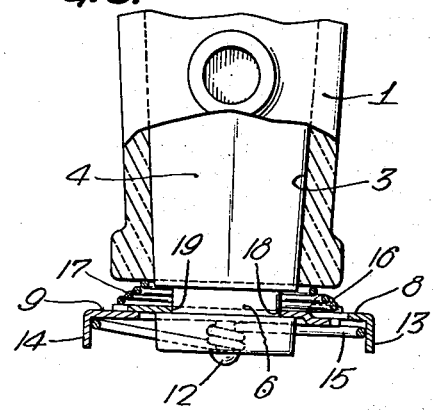
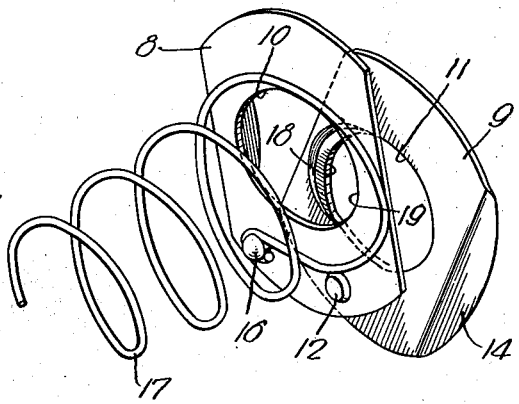
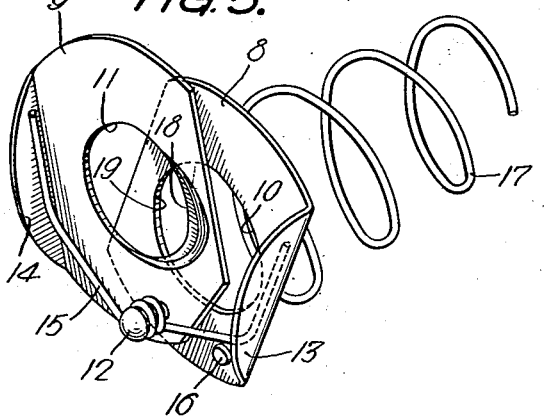
Inventor:—
Leopold J. Schmid
by his Attorneys
Howson & Howson United States Patent Office 2,708,562
Patented May 17, 1955

2,708,562

VALVE PLUG RETAINING DEVICE

Leopold J. Schmid, Philadelphia, Pa., assignor to Arthur H. Thomas Company, Philadelphia, Pa., a corporation of Pennsylvania Application February 5, 1951, Serial No. 209,379

5 Claims. (Cl. 251—181)

This invention relates to new and useful improvements in the stopcocks and valves of chemical and laboratory equipment, and more particularly to novel means for retaining the plugs of such stopcocks and valves in position under tension.

Customarily the stopcocks and valves of chemical and laboratory equipment are made of glass and comprise a sleeve member interconnected crosswise between two sections of glass tubing. The sleeve has a tapered bore longitudinally therethrough in which is rotationally mounted a valve plug of corresponding taper having at one end a suitable handle portion by which the technician can manually rotate the valve plug within the sleeve. One of the difficulties continuously encountered in the use of these stopcocks and valves is that of maintaining the rotary valve plug seated firmly within the sleeve to prevent leakage between the valve parts.

In the past it has been the practice to endeavor to meet this difficulty by means of an elastic ring or washer which is fitted over the projecting smaller end of the plug and seated in a circumferential groove or recess provided therein adjacent the end of the valve sleeve. However, such rings or washers are too easily displaced from the plug to afford any positive retention thereof in the sleeve and they do not provide any positive tension urging the valve plugs normally into firm seating engagement with the sleeve.

Further efforts to solve the problem recently have been advanced in the form of mechanical devices for positively securing the plug in position in the sleeve under tension but these have not met with success in the market because they comprise a multiplicity of separate parts and require the use of a person's two hands to assemble and install them.

With the foregoing in mind, the principal object of the present invention is to provide a novel plug retaining device for valves of the type described which comprises a unitary assemblage of parts and may be readily and easily manipulated and installed by a person using only one hand, the other hand being free to hold the valve plug in position against displacement during installation of the device.

Another object of the invention is to provide a valve plug retaining device having the features and advantages set forth which is of comparatively simplified, inexpensive construction and highly effective and efficient in use.

These and other objects of the invention and the various features and details of the construction and operation thereof are hereinafter fully set forth and described with reference to the accompanying drawing, in which:

Fig. 1 is a side elevational view of a stopcock or valve of the type commonly employed in chemical and laboratory apparatus showing the same in conjunction with a valve plug retaining device made according to the present invention;

Fig. 2 is an enlarged end elevational view of the disclosure in Fig. 1 of the drawing as viewed from the left;

Fig. 3 is an enlarged fragmentary sectional view on line 3—3, Fig. 2; and

Figs. 4 and 5 are detached perspective views of the valve plug retaining device showing the details of construction thereof.

Referring now more particularly to the drawing, the valve plug retaining device of the present invention is shown in conjunction with a conventional type of valve usually employed in chemical and laboratory apparatus. The valve, made of glass or other suitable material, comprises a sleeve 1 which is interconnected crosswise between sections of glass tubing 2, for example, in the relation shown in Fig. 1 of the drawing. The valve sleeve 1 has a tapered bore 3 extending therethrough in a direction longitudinally of the sleeve and transversely of the direction of flow through the tubing 2.

Rotationally received within the bore 3 of the valve sleeve 1 is a correspondingly tapered valve plug 4 having integral with its larger end a handle portion 5 by means of which a technician may manually rotate the valve plug 4 to its desired position with respect to the sleeve 1. The smaller end of the valve plug 4 projects a short distance beyond the adjacent end of the valve sleeve 1 and in accordance with customary practice this projecting end portion of the plug 4 is provided with a circumferential groove or recess 6 which is spaced a short distance inwardly from the end of the plug and the adjacent end face of the valve sleeve 1, for example, in the relation shown in Fig. 3 of the drawing.

A device made according to the present invention for retaining the valve plug 4 within its sleeve 1 under tension comprises a pair of generally similar plate members 8 and 9 each having an opening 10 and 11 respectively therethrough of a diameter sufficiently large to permit passage of the projecting small end portion of the valve plug 4 through said openings 10 and 11. The generally similar plate members 8 and 9 are pivotally connected together at one end, for example, by means of a rivet 12, so that said plates 8 and 9 are disposed in lapped relation for movement in opposite directions with respect to one another between an inner limit position in which the two plates 8 and 9 entirely overlap one another with their openings 10 and 11 in substantial registry, and an outer position in which the two plates and their openings 10 and 11 are substantially out of register, for example, as shown in Figs. 4 and 5 of the drawing.

The outer side edge of each plate 8 and 9 is bent upwardly as indicated to provide ears 13 and 14, respectively against which bear the opposite end portions of a spring 15. The spring 15 has its central portion coiled about the aforesaid rivet 12 and the opposite portions of the spring 15 are disposed so that their end portions are engaged against the inner sides of the ears 13 and 14 and act normally to urge the plate members 8 and 9 outwardly with respect to each other. In addition to providing bearing surfaces for the opposite ends of the spring 15, the ears 13 and 14 provide outwardly facing surfaces for the technician to grasp the device between his fingers and manually actuate the plates 8 and 9 to their inner limit position against the outward bias of spring 15.

Connected to the outer side of the plate 8, for example, by means of a rivet 16, is one end of a coil spring 17. The opposite end of the coil spring 17 is free and unsupported and the minimum diameter of the individual convolutions of the spring 17 is greater than the plug 4 so that the spring may be passed in an axial direction over the smaller end portion of the valve plug 4 which projects beyond the end of the valve sleeve 1.

To secure the valve plug 4 properly within its sleeve 1 by the device of the present invention, the technician holds the valve plug in the sleeve, for example, by engaging his left hand with the valve handle 5. The outer surfaces of the ears 13 and 14 of the retaining device are then grasped by the thumb and forefinger of the right hand and the plate members 8 and 9 are actuated against the action of the spring to their inner limit position with the openings 10 and 11 thereof disposed in substantial alignment for registry. With the plates in this position the free end of the coil spring 17 is passed over the projecting end portion of the valve plug 4 at the same time compressing the spring 17 until the plate members 8 and 9 are disposed in surrounding confronting relation to the circumferential groove or recess 6 in the plug 4. The technician then releases the pressure on the ear portions 13 and 14 thus allowing the spring 15 to actuate the plates 8 and 9 outwardly in opposite directions with respect to each other to thereby engage opposite edge portions 18 and 19 of the respective plate members 8 and 9 within the plug groove or recess 6, for example, as and in the relation shown in Fig. 3 of the drawing. In this connection it is to be noted that the edge portion 18 of the plate 9 is offset slightly as indicated so that said edge portion 18 lies in the same plane as the edge portion 19 of the plate 8, for example, in the relation more clearly shown in Fig. 3 of the drawing.

By this construction the plug 4 is retained against accidental displacement from its sleeve 1 and the forces stored in the compressed coil spring 17 act in a direction axially outward to continuously bias the plug 4 inwardly of its sleeve 1.

While a particular embodiment of the present invention has been illustrated and described herein, it is not intended to limit the invention to such disclosures, and changes and modifications may be incorporated and embodied therein within the scope of the following claims.

I claim:

1. As a new article of manufacture, an attachment for retaining a valve plug seated in a sleeve under tension, comprising a pair of generally similar plates each having an opening therein of a diameter to receive an end of the valve plug and pivotally connected together in lapped relation for movement in opposite directions between an inner limit position in which said plates entirely overlap one another with their openings in register and an outer position in which said plates and their openings are substantially out of register, spring means acting on the plates operable normally to bias said plates outwardly to said outer position, and a coil spring anchored to one of said plates and extending freely outwardly therefrom with the axis of its convolutions generally aligned with the opening in said one plate, said coil spring being compressible and adapted to act against the sleeve to retain the plug therein under tension.

2. As a new article of manufacture, an attachment for retaining a valve plug seated in a sleeve under tension, comprising a pair of generally similar plates each having an opening therein of a diameter to receive an end of the valve plug, means pivotally connecting said plates together in lapped relation for movement in opposite directions between an inner limit position in which said plates entirely overlap one another with their openings in register and an outer position in which said plates and their openings are substantially out of register, spring means acting on the plates operable normally to bias said plates outwardly to said outer position, and a coil spring anchored to one of said plates and extending freely outwardly therefrom with the axis of its convolutions generally aligned with the opening in said one plate, said coil spring being compressible and adapted to act against the sleeve to retain the plug therein under tension.

3. As a new article of manufacture, an attachment for retaining a valve plug seated in a sleeve under tension, comprising a pair of generally similar plates each having an opening therein of a diameter to receive an end of the valve plug and pivotally connected together in lapped relation for movement in opposite directions between an inner limit position in which said plates entirely overlap one another with their openings in register and an outer position in which said plates and their openings are substantially out of register, ears at the outer edges of said plates, spring means anchored to the plates and bearing against said ears operable normally to bias said plates outwardly to said outer position, and a coil spring anchored to one of said plates and extending freely outwardly therefrom with the axis of its convolutions generally aligned with the opening in said one plate, said coil spring being compressible and adapted to act against the sleeve to retain the plug therein under tension.

4. As a new article of manufacture, an attachment for retaining a valve plug seated in a sleeve under tension, comprising a pair of generally similar plates each having an opening therein of a diameter to receive an end of the valve plug, means pivotally connecting said plates together in lapped relation for movement in opposite directions between an inner limit position in which said plates entirely overlap one another with their openings in register and an outer position in which said plates and their openings are substantially out of register, ears at the outer edges of said plates, spring means anchored to the plates and bearing against said ears operable normally to bias said plates outwardly to said outer position, and a coil spring anchored to one of said plates and extending freely outwardly therefrom with the axis of its convolutions generally aligned with the opening in said one plate, said coil spring being compressible and adapted to act against the sleeve to retain the plug therein under tension.

5. As a new article of manufacture, an attachment for retaining a valve plug seated in a sleeve under tension, a pair of generally similar plates each having an opening therein of a diameter to receive an end of the valve plug, means pivotally connecting said plates together in lapped relation for movement in opposite directions between an inner limit position in which said plates entirely overlap one another with their openings in register and an outer position in which said plates and their openings are substantially out of register, ears at the outer edges of said plates, and spring means anchored to the plates and bearing against said ears operably normally to bias said plates outwardly to said outer position.

References Cited in the file of this patent

UNITED STATES PATENTS

| | | |
|---|---|---|
| 967,460 | Straub | Aug. 16, 1910 |
| 1,304,150 | Blaylock | May 20, 1919 |
| 2,334,801 | Zimmerman | Nov. 23, 1943 |
| 2,420,061 | Adams | May 6, 1947 |
| 2,586,453 | Bradbury | Feb. 19, 1952 |
| 2,621,887 | Todd | Dec. 16, 1952 |

FOREIGN PATENTS

| | | |
|---|---|---|
| 500,661 | Great Britain | Feb. 14, 1939 |